US012337282B2

(12) United States Patent
Tomescu (10) Patent No.: US 12,337,282 B2
(45) Date of Patent: Jun. 24, 2025

(54) POTTED FLAT SHEET MEMBRANE FILTRATION MODULE (71) Applicant: THETIS ENVIRONMENTAL INC., Hamilton (CA)

(72) Inventor: Ionel John Tomescu, Ancaster (CA)

(*) Notice: Subject to any disclaimer, the term of this patent is extended or adjusted under 35 U.S.C. 154(b) by 238 days.

(21) Appl. No.: 17/205,391

(22) Filed: Mar. 18, 2021

(65) Prior Publication Data

US 2021/0205759 A1 Jul. 8, 2021

Related U.S. Application Data (63) Continuation of application No. 14/926,311, filed on Oct. 29, 2015, now abandoned, which is a continuation-in-part of application No. PCT/CA2015/050412, filed on May 8, 2015.

(60) Provisional application No. 62/246,381, filed on Oct. 26, 2015, provisional application No. 62/072,741, filed on Oct. 30, 2014, provisional application No. 61/990,366, filed on May 8, 2014.

(51) Int. Cl.
*B01D 63/08* (2006.01)
*B29C 41/04* (2006.01)
*B29C 41/20* (2006.01)
*B29L 31/14* (2006.01)

(52) U.S. Cl.
CPC ............ *B01D 63/081* (2013.01); *B29C 41/04* (2013.01); *B29C 41/20* (2013.01); *B01D 2313/025* (2013.01); *B01D 2313/146* (2013.01); *B01D 2313/21* (2013.01); *B29L 2031/14* (2013.01)

(58) Field of Classification Search
None
See application file for complete search history.

(56) References Cited

U.S. PATENT DOCUMENTS

| 4,761,229 | A |   | 8/1988  | Thompson et al. |
|-----------|---|---|---------|-----------------|
| 4,959,152 | A |   | 9/1990  | Nichols et al.  |
| 5,000,855 | A | * | 3/1991  | Nichols ............. B01D 63/081 210/336 |
| 5,002,667 | A |   | 3/1991  | Kutowy et al.   |
| 5,096,591 | A |   | 3/1992  | Benn et al.     |
| 5,264,171 | A |   | 11/1993 | Prasad et al.   |

(Continued)

FOREIGN PATENT DOCUMENTS

| EP | 0046015 A1 * | 7/1981 |
| WO | 9722394 A1   | 6/1997 |

(Continued)

OTHER PUBLICATIONS

International Patent Application No. PCT/CA2015/050412, International Search Report and Written Opinion dated Oct. 5, 2015.

(Continued)

*Primary Examiner* — Richard C Gurtowski
*Assistant Examiner* — Eric J McCullough
(74) *Attorney, Agent, or Firm* — Smart & Biggar LP (57) ABSTRACT

A filtration element has one or more rigid inserts in a housing. The inserts are covered with membranes. The element is configured to provide open feed channels beside the inserts. The membranes and inserts are potted at an edge, optionally at only part of an edge such as a corner. Permeate flows between the membrane and the insert to the potted edge. The membranes may be potted in a centrifuge.

5 Claims, 13 Drawing Sheets

FILTRATION MODULE – CROSS SECTION AND DETAIL

(56) References Cited

U.S. PATENT DOCUMENTS

| | | | |
|---|---|---|---|
| 5,626,752 A | | 5/1997 | Mohn et al. |
| 2001/0047962 A1* | | 12/2001 | Zha ................. B01D 65/02 |
| | | | 134/102.1 |
| 2006/0273007 A1* | | 12/2006 | Zha ................. B01D 65/08 |
| | | | 210/636 |
| 2007/0125642 A1 | | 6/2007 | Perry |
| 2011/0186513 A1* | | 8/2011 | Vuong ............... B01D 65/08 |
| | | | 210/636 |
| 2011/0253624 A1 | | 10/2011 | Ewing |
| 2012/0312162 A1* | | 12/2012 | Theodore ........... B64D 37/32 |
| | | | 95/47 |
| 2013/0240434 A1 | | 9/2013 | Yaeger et al. |
| 2013/0248450 A1 | | 9/2013 | Kenley et al. |
| 2018/0021732 A1 | | 1/2018 | Osmundson et al. |
| 2018/0154313 A1 | | 6/2018 | Osmundson et al. |

FOREIGN PATENT DOCUMENTS

| | | |
|---|---|---|
| WO | 9955448 A1 | 11/1999 |
| WO | 0110540 A2 | 2/2001 |
| WO | 2005107929 A2 | 11/2005 |
| WO | 2007045015 A1 | 4/2007 |
| WO | 2011075748 A1 | 6/2011 |
| WO | 2011149988 A1 | 12/2011 |
| WO | 2012065036 A1 | 5/2012 |
| WO | 2015153885 A1 | 10/2015 |
| WO | 2018018013 A1 | 1/2018 |

OTHER PUBLICATIONS

International Patent Application No. PCT/CA2016/051235, International Preliminary Report on Patentability dated May 11, 2018.
International Patent Application No. PCT/CA2016/051235, International Search Report and Written Opinion dated Jan. 10, 2017.
"Membranes the World Can Reply On", Berghof Membrane Technology—Company Presentation, 2013, www.berghof.com, 53 Pages.
U.S. Appl. No. 14/926,311, Final Office Action dated Jan. 11, 2019.
U.S. Appl. No. 14/926,311, Advisory Action dated Dec. 28, 2020.
U.S. Appl. No. 14/926,311, Advisory Action dated Mar. 26, 2019.
U.S. Appl. No. 14/926,311, Non-Final office action dated Jan. 13, 2020.
U.S. Appl. No. 14/926,311, Non-Final office action dated Sep. 18, 2020.
U.S. Appl. No. 14/926,311, Non-Final office action dated Sep. 21, 2018.

* cited by examiner

FIGURE 2

FILTRATION SHEET (10) – ISOMETRIC VIEW

FIGURE 3 A) FILTRATION SHEET WITH CUT-OUT

FIGURE 3 B) FILTRATION SHEET WITHOUT CUT-OUT

BUNDLE (15) – ISOMETRIC VIEW

FIGURE 4

END-CAPS (18) – ISOMETRIC VIEW

SPACER RING (19) – ISOMETRIC VIEW

FILTRATION MODULE – CROSS SECTION AND DETAIL

DETAIL "C"

STATIC POTTING WITH INSERTS

SPACER RING - VACUUM FORMED OR EXTRUDED – ISOMETRIC VIEW

POTTED FLAT SHEET MEMBRANE FILTRATION MODULE

RELATED APPLICATIONS

This application is a continuation of U.S. patent application Ser. No. 14/926,311, filed Oct. 29, 2015, which claims the benefit of U.S. provisional application No. 62/072,741, filed on Oct. 30, 2014; U.S. provisional application No. 62/246,381, filed on Oct. 26, 2015; and is a continuation in part of International Application No. PCT/CA2015/050412 filed on May 8, 2015 which claims priority to U.S. provisional application No. 61/990,366, filed on May 8, 2014, and U.S. provisional application No. 62/072,741, filed on Oct. 30, 2014. U.S. patent application Ser. No. 14/926,311; U.S. provisional application Nos. 62/072,741; 62/246,381; and 61/990,366 and International Application No. PCT/CA2015/050412 are incorporated by reference.

FIELD

This application relates to membrane modules and methods of making them.

BACKGROUND

Flat sheet membranes are typically made by casting liquid dope onto a substrate. The substrate may be, for example, a woven or non-woven fabric. Pores are formed and the dope is cured into a solid membrane after casting. The pore formation and curing mechanism may be, for example, interfacial polymerization or non-solvent induced phase separation. The resulting flat sheet membrane may have pores in a range from reverse osmosis to microfiltration.

Flat sheet membranes are typically used to create spiral wound membrane modules, immersed modules with the membranes in large flat sheets attached to a frame, or in compressed stacks wherein the membranes are intermixed with alternating layers of feed carrier and permeate carrier sheets. In another module, described in U.S. Pat. No. 5,626,752, a stack is formed of membrane filter elements each having a stabilizing element positioned between outer membrane sheets. The stacked units are sequentially arranged in a housing. A flow medium flows in sequence through the stacked units.

INTRODUCTION TO THE INVENTION

This specification describes a filtration element, alternatively called a module or device, and a method of making it. The filtration element includes multiple filtration sheets, which are assemblies of a) one or more flat sheet membranes and b) one or more inserts, one or more permeate carriers, or a combination of one or more inserts and one or more permeate carriers. A filtration sheet is sealed, preferably by potting, in a housing, alternatively called a shell. The membranes may be, for example, microfiltration (MF) or ultrafiltration (UF) membranes. The filtration element may be used, for example, for water filtration including wastewater filtration.

In various examples described herein, a filtration sheet has an insert on the permeate side of a membrane, a permeate carrier (alternatively called a permeate spacer) on the permeate side of a membrane, or both. The inserts are stiffer than a conventional permeate carrier and structural in the sense that they provide support for the membranes, for example to reduce vibration or other movement when in use, or to help locate the membranes within the element. The insert is optionally solid, or non-porous, with smooth surfaces or optionally with one or more surfaces that provide channels for permeate flow across the surface of the insert. In the examples illustrated herein, two membranes are attached to or around an insert, or to or around a permeate carrier, or to or around a combination of one or more inserts and one or more permeate carriers, to provide a filtration sheet having a sealed interior, or permeate side. The outer, or feed, side of the filtration may be exposed to feed water channels within the filtration element. Feed spacer material in the feed water channels is optional. Optionally, turbulence may be provided in the feed water channels without a feed spacer by way of feed cross flow in a manner similar to tubular membranes.

A filtration element typically has a plurality of filtration sheets. The inserts, if any, and permeate carriers, if any, define part of a permeate side of a filtration element. The inserts may include passages for taking permeate to edges of the filtration sheets, or passages for taking permeate to edges of the filtration sheets may be provided by permeate spacers, or both. In some examples, two membranes are bonded together to form an envelope around an insert and two permeate carriers. In another example, no insert is used and a permeate carrier, bonded or not to the backing of the membranes, is introduced between the membranes. Preferably, the filtration sheets are potted in the filtration element. In this case, potting material, usually a thermosetting resin, separates the permeate side of the element from its feed side. Permeate is collected on a permeate side of the potting material. Optionally, the permeate passages may be opened after potting, for example by cutting a notch through the potting material and the membrane.

In some examples, the membranes are potted in a centrifuge. The centrifuge may be arranged such that the potting material is applied to only part of the edge of a membrane. In one example, membranes are potted in a centrifuge spinning about a generally vertical axis with only enough potting material to cover corners of the membranes.

The elements may be used, for example, in a cross flow membrane process. The feed side pressure is preferably below 1 bar. For example, the module may be used in a system and process as described in International Application No. PCT/CA2015/050412 filed on May 8, 2015, which is incorporated by reference.

DETAILED DESCRIPTION

Figure 1A:
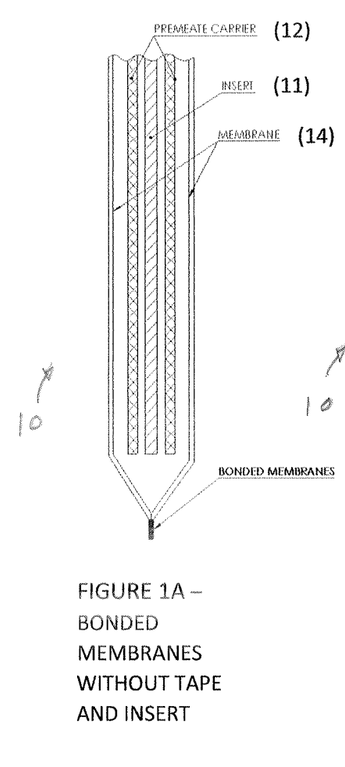
FIG. 1A is a cross section of part of a first alternative filtration sheet that has bonded membranes without tape and an insert.
Figures 1B, 1C:
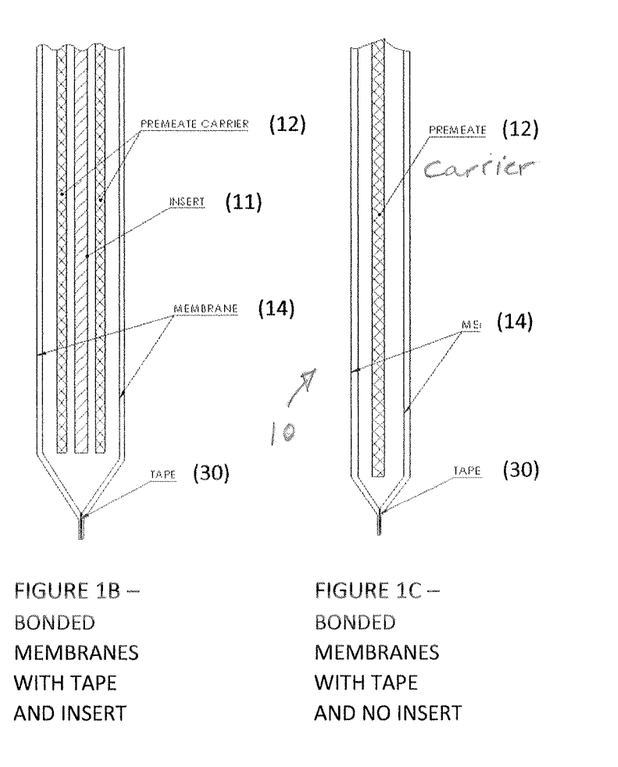
FIG. 1B is a cross section of part of a second alternative filtration sheet that has bonded membranes with tape and an insert.
FIG. 1C is a cross section of part of a third alternative filtration sheet that has bonded membranes with tape and no insert.

FIGS. 1A and 1B each represent a cross section of a filtration sheet (10) comprising an insert (11), optionally one or more permeate spacers (12), alternatively called permeate carriers, and one or more flat sheet membranes (14). Optionally, a permeate spacer (12) may be used alone, without an insert, as shown in FIG. 1C. In the examples of FIGS. 1A, 1B and 10, the membranes (14) are bonded to each other to form an envelope around the insert (11) or permeate carrier (12) or both. The insert (11), if used, is stiffer than a conventional permeate carrier (12). For example, the insert (11) may be made of a single piece of material, for example a homogenous and continuous plastic sheet or film, in contrast to a permeate carrier (12) which is conventionally made of multiple filaments. The insert (11) may optionally be non-porous. In the examples of FIGS. 1A and 1B, the inserts (11) are solid, smooth surfaced, non-porous sheets of plastic, typically 0.3 to 3 mm thick.

Figure 1D:
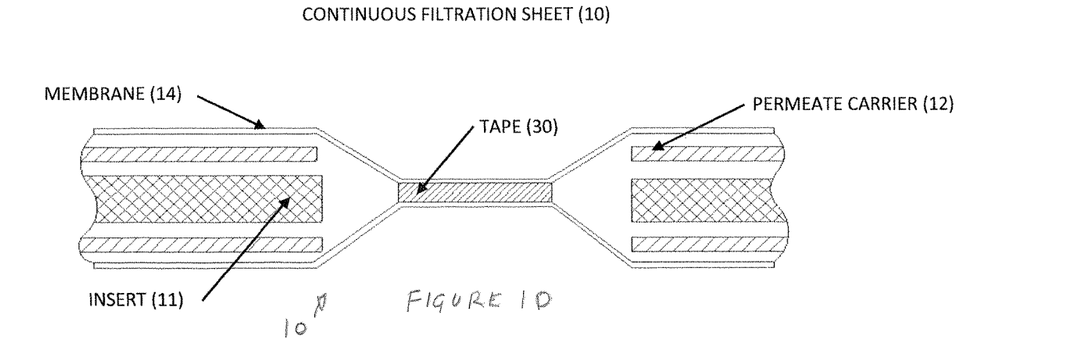
FIG. 1D is a cross sections of part of a first alternative continuous filtration sheet having membranes bonded with a single strip of tape.
Figure 1E:
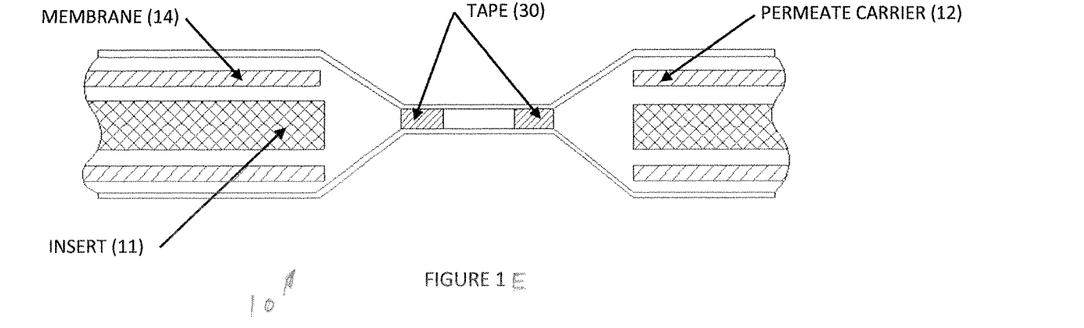
FIG. 1E is a cross section of part of a second alternative continuous filtration sheet having membranes bonded with two tape strips.
Figure 1F:
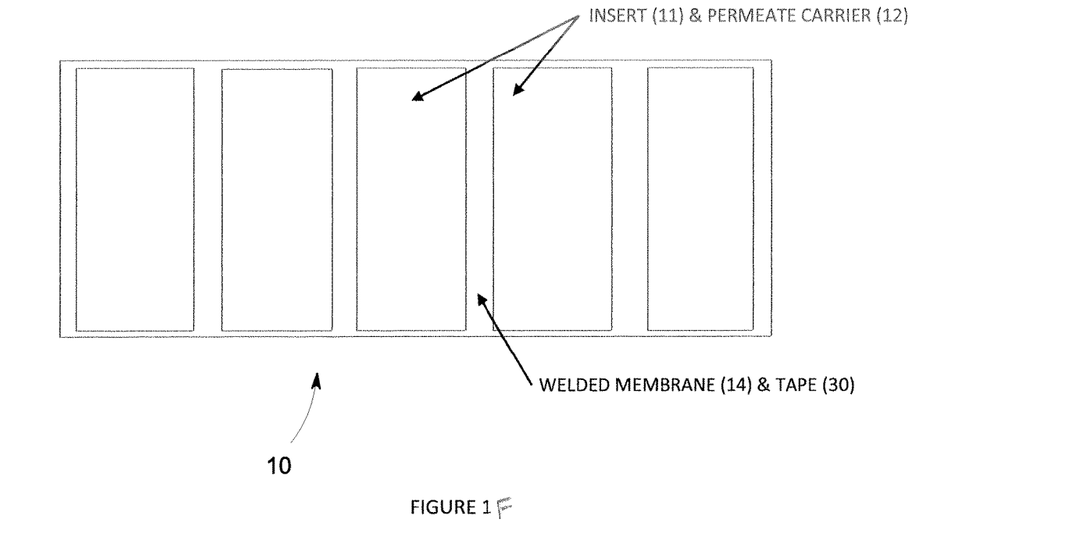
FIG. 1F is a plan view of a continuous filtration sheet according to FIG. 1D or FIG. 1E.

Assembly of the filtration sheet (10), in particular bonding of the membranes (14), can be done using welding with a seam tape. This tape (30) can be of various widths, typically between three and ten millimeters, and will be added along one or more edges of the filtration sheet (10) between the flat sheet membranes (14). The tape (30) is activated with the heat produced by various means like direct heat, RF, impulse, sonic welding or other means during the welding process. The tape (30) may be made of different materials to suit the various technical requirements for welding, as well as various operational parameters such as: type of filtered fluid, chemical and physical characteristics of the filtered fluid and its contaminants, temperature, cleaning methods, etc. The tape (30) can be applied to separate membrane sheets (14) as shown in FIG. 1B to provide a discrete filtration sheet (10), or with additional welds spanning between two edges to form a continuous filtration sheet (10) with a plurality of envelopes, each surrounding an insert (11) and permeate spacer (12), as shown in FIGS. 1D, 1E and 1F.

Figure 2:
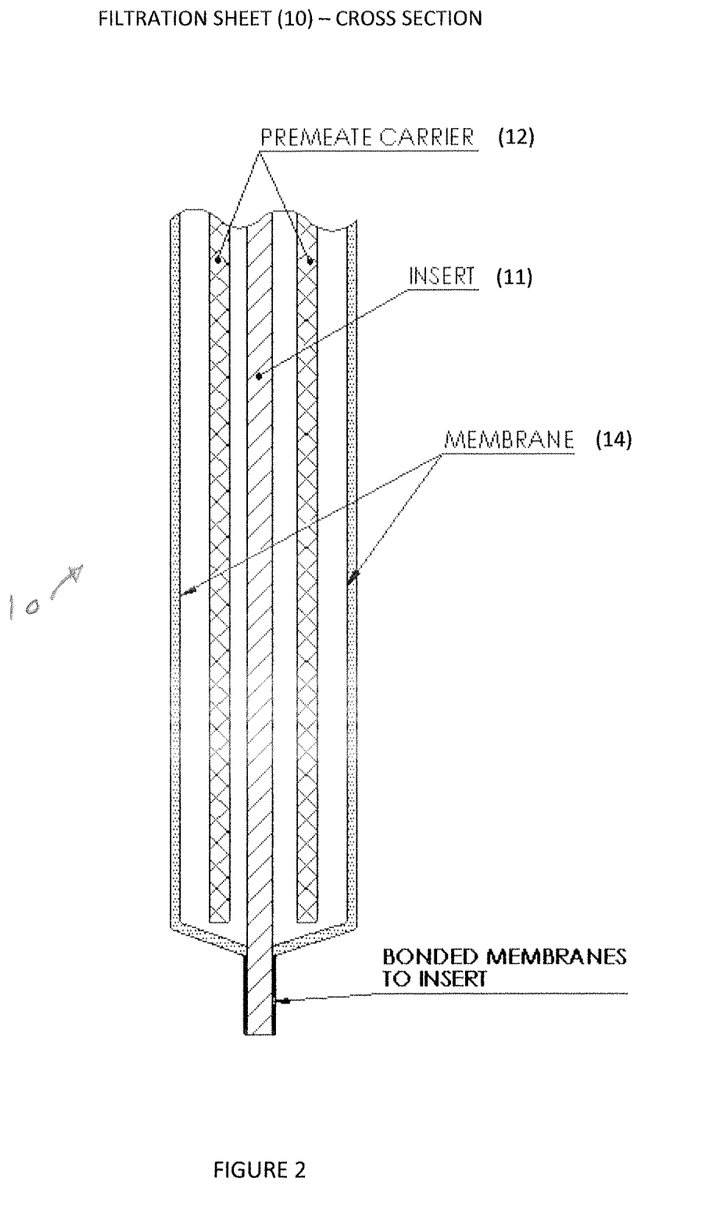
FIG. 2 is a cross section of a fourth alternative filtration sheet having membranes bonded to an insert.

Alternatively, the membranes (14) can be bonded directly on the insert (11) as shown in FIG. 2. One option for bonding the membranes (14) on the insert (11) is shown in FIG. 2. However, the membranes (14) can be bonded at any point on the insert (11). Optionally, or additionally, a feed spacer can also be bonded to the membrane (14) and the insert (11), or a feed spacer can be located in between sets of filtration sheets (10). The membrane (14) may optionally have pores in the microfiltration or ultrafiltration range.

The insert (11) is a relatively rigid component manufactured from one or more materials such as plastic, metal, fiber reinforced plastic (FRP) or sintered plastic or metal. A filtration sheet (10) may have a structural insert (11) and a membrane (14). The insert (11) serves as a support for a flat sheet membrane (14). Optionally, the insert (11) may also serve as a carrier for the filtered liquid (permeate). In this case, the side faces of the insert (11) have a recessed or textured surface that can be obtained through machining or directly in an injection-molding tool. The surface can include channels in a single orientation, multiple orientation, random directions, a rough or textured surface or any other surface that will create a space between the membrane (14) and the insert (11) allowing the filtered liquid to flow towards one or more edges of the insert (11). The insert (11) can also be a porous metal. Alternatively or additionally, a permeate spacer (12), for example of the type used in spiral wound membranes, may be placed between the membrane (14) and the insert (11), or the permeate spacer (12) may replace the insert (12) altogether. When a permeate spacer (12) is used along with an insert (11), the insert (11) may optionally have a smooth surface.

The membrane (14) is attached to the insert (11) for example by gluing or welding. The welding may be done by various methods, like ultrasound, radiofrequency, direct heat, or impulse heat. The attachment may be continuous around the circumference of the membrane. Alternatively, the membrane (14) is not attached to the insert (11) along one or more permeating edges. Optionally, the membrane (14) can be folded around one edge or multiple edges of the insert (11), attached to the insert (11) along two or more edges of the insert (11), or attached at any point on the insert (11). Optionally, the membrane (14) can be left open along at least part of at least one permeating edge of the insert (11). Optionally, the membrane (14) can be held in place on a permeating edge of the insert (11) by mechanical means or by a discontinuous line of adhesive or welding until the next assembly operation. The backing surface of the membrane (14) between its edges may or might not be permanently attached to the insert (11).

The membrane (14) can be either a flat sheet membrane casted separately and attached to the structural insert (11) or a membrane formed directly on the structural insert (11). If the insert (11) is made at least partially from a porous material, the membrane (14) can be coated directly on the insert (11) using any membrane forming method known in the art. Alternatively, a separate flat sheet membrane (14) can be made by any method or materials known in the art. For example, a flat sheet membrane (14) can be made by casting one or more reactive solutions onto a non-woven substrate. A flat sheet membrane typically has a thinner membrane wall than a tubular membrane and may have higher flux. The insert (11) and membrane (14) optionally have one or more raised edges. Alternatively, the insert (11) and membrane (14) may be essentially planar.

Figure 3A:
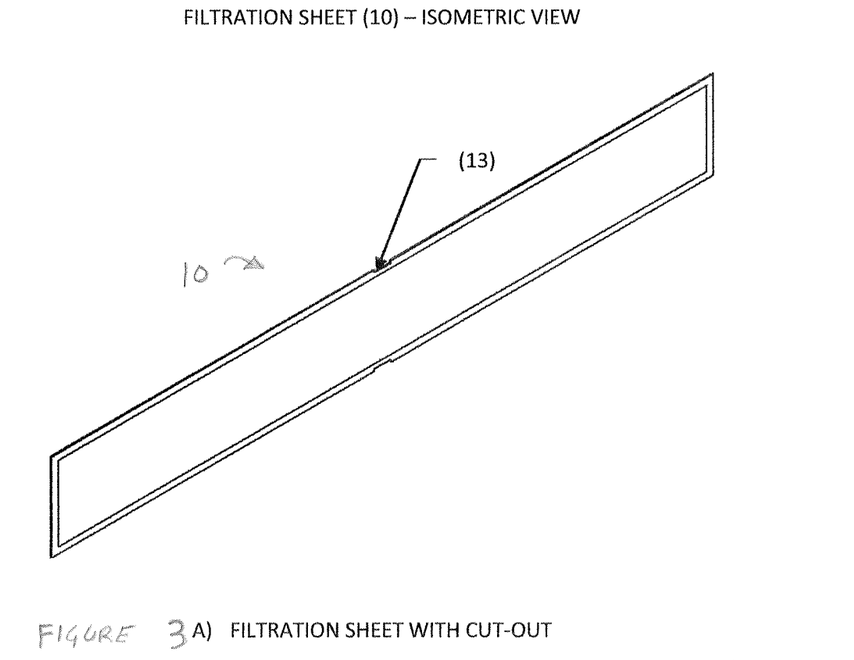
FIG. 3A is an isometric view of a filtration sheet according to FIG. 2 with a cutout.
Figure 3B:
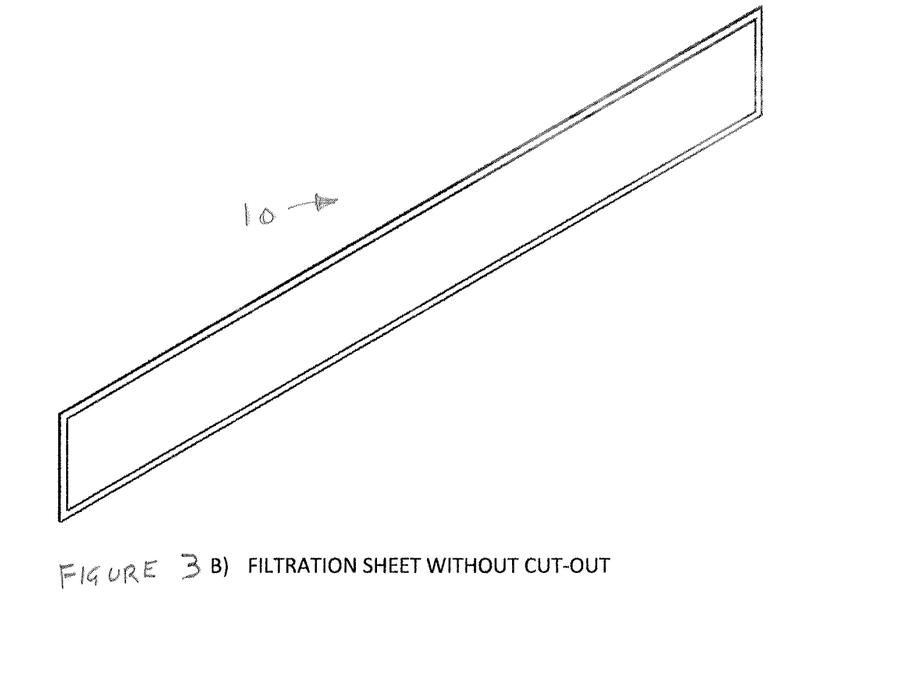
FIG. 3B is an isometric view of a filtration sheet according to FIG. 2 without a cutout.

FIGS. 3A and 3B are isometric views of the filtration sheets (10) of FIG. 2. The optional cutout (13) in the membrane filtration sheet (10) is for the spacer rings (19) described below and may or may not be required. FIG. 3A is an isometric view of the filtration sheet (10) of FIG. 2 with the cut-out (13) for the spacer rings (19), while FIG. 3B is an isometric view of the filtration sheet (10) of FIG. 2 without the cutout.

Figure 4:
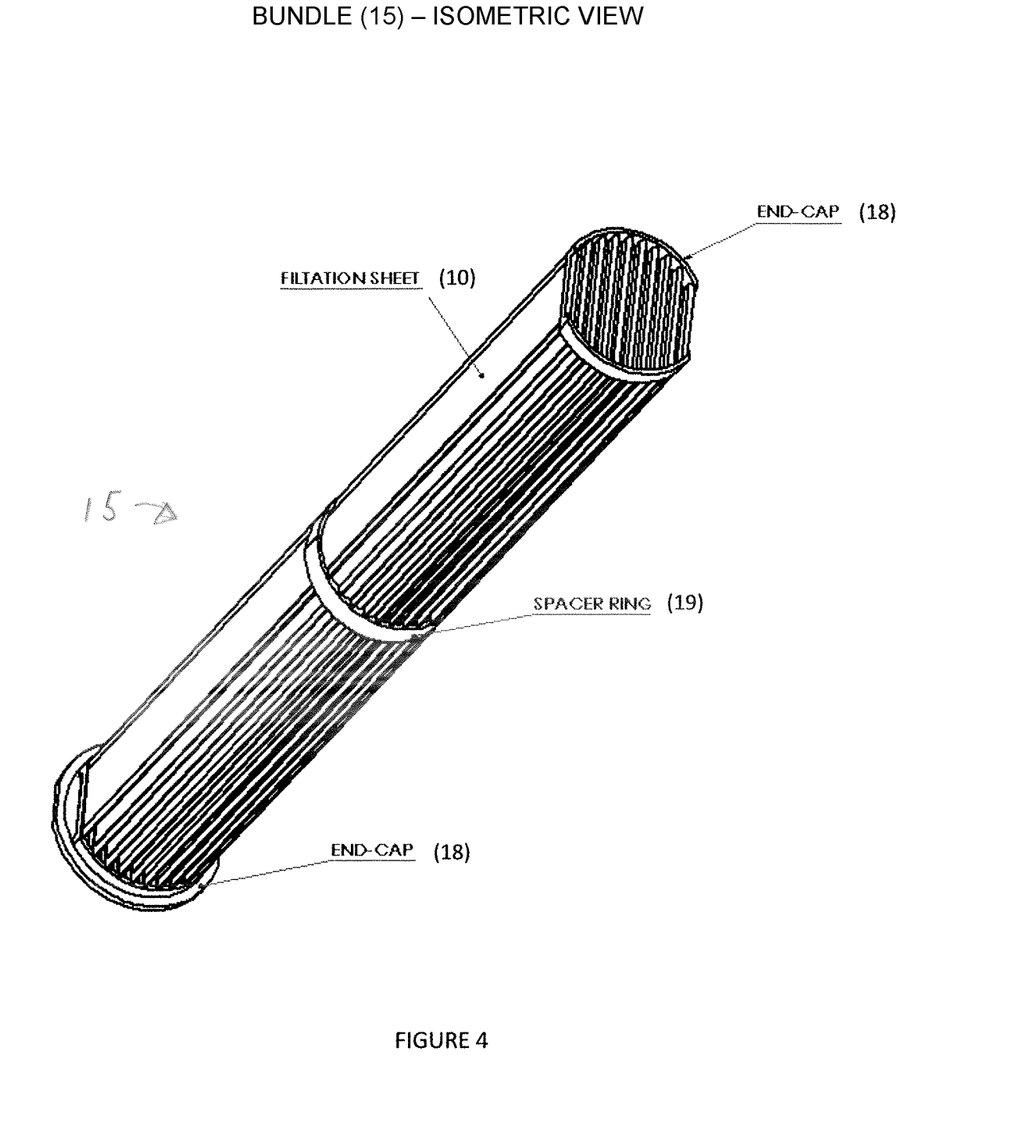
FIG. 4 is an isometric view of a bundle having filtration sheets according to FIG. 2, two end caps and a spacer ring.

FIG. 4 is an isometric view of a bundle (15) having a plurality of the filtration sheets 10 of FIG. 2. The filtration sheets (11) can be assembled together using mechanical fasteners, adhesives or, preferably, by potting them together. During or after the assembly of the bundle (15), optional feed spacers, end-caps (18) and spacer rings (19), may be placed in between the filtration sheets (10) as shown in FIG. 4. The filtration sheets (10) have different widths so that the bundle (15) can be mounted inside of a cylindrical housing.

Figure 5A:
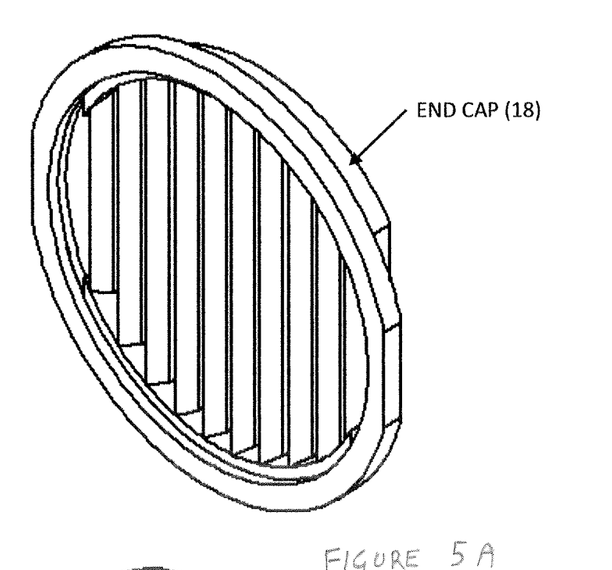
FIG. 5A is an isometric view of the end cap shown on the left side of the bundle assembly of FIG. 4.
Figure 5B:
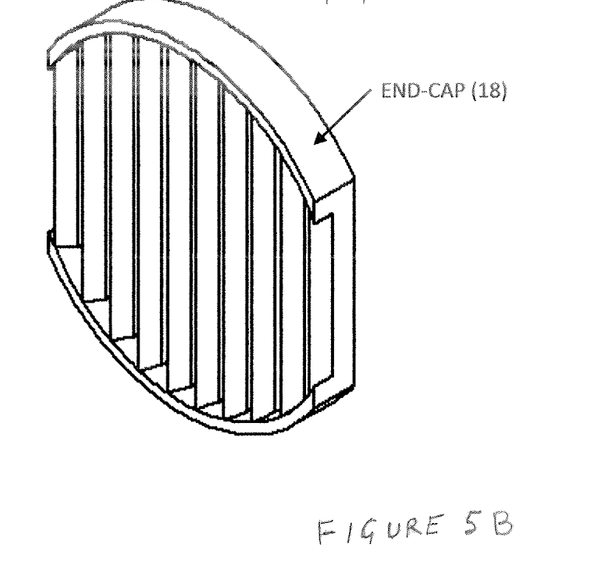
FIG. 5B is an isometric view of the end cap shown on the right side of the bundle assembly of FIG. 4.

The end-caps (18) are shown in more detail in FIG. 5A and FIG. 5B. The end caps (18) may be fitted at one or both ends of the bundle (15). The end-caps (18) have openings for the feed or retentate fluid to pass through. The purpose of the end caps (18) is to protect the edges of the filtration sheets (10) and to provide for consistent spacing between the membrane filtration sheets (10).

Figure 6A:
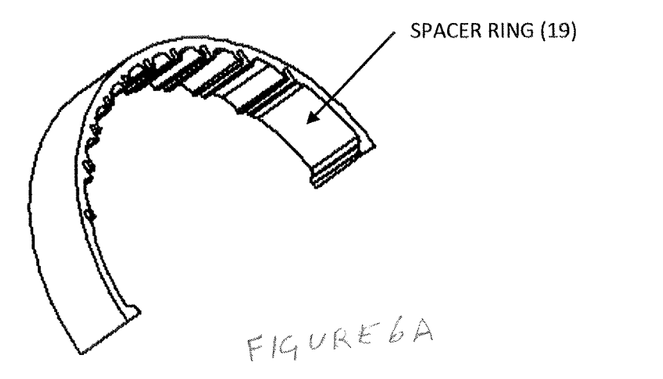
FIG. 6A is an isometric view of one half of the spacer ring of the bundle assembly of FIG. 4 showing primarily the inside of the spacer ring.
Figure 6B:
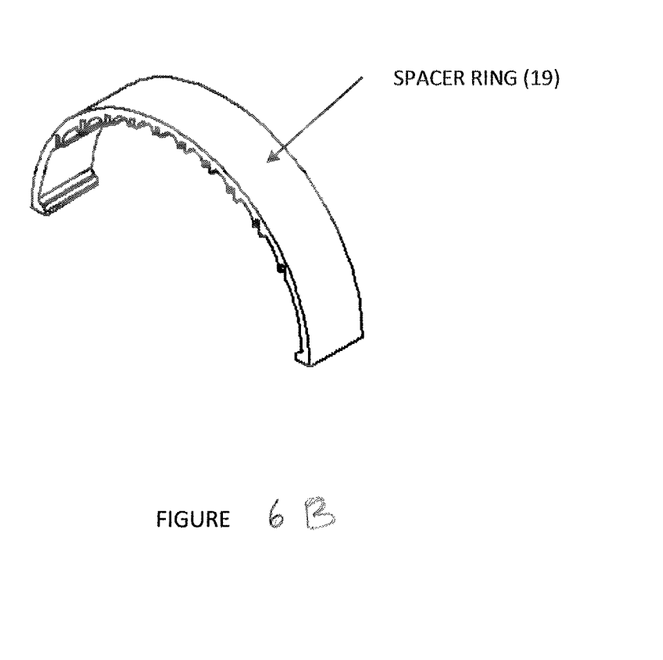
FIG. 6B is another isometric view of the half spacer ring of FIG. 6A showing primarily the outside of the spacer ring.

The spacer ring (19) is shown in more detail in FIGS. 6A and 6B. One or more feed spacer rings (19) of different lengths and configurations may be attached to the bundle (15) along the length of the bundle (15).

The optional end-caps (18) and spacer rings (19) may be made from one or more materials such as plastic, metal, fiber reinforced plastic (FRP) or sintered plastic or metal, and may be manufactured through different methods, such as machining, extrusion, water-jet cutting, vacuum forming, or directly in an injection-molding tool.

Figures 11A, 11B:
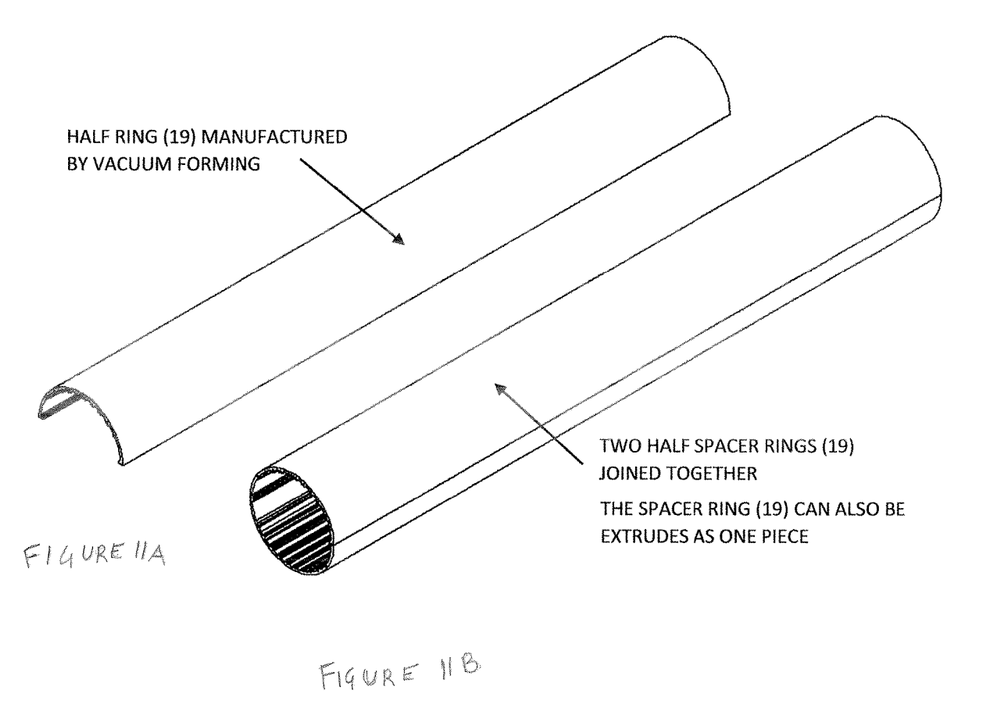
FIG. 11A is an isometric view of half of an alternative spacer ring.
FIG. 11B is an isometric view of two of the half spacer rings of FIG. 11A joined together to form a complete spacer ring.

FIGS. 11A and 11B show a longer spacer ring (19) that has been manufactured by vacuum forming in two halves. The two halves of the spacer ring (19) are joined together during assembly of the bundle (15). The filtration sheets (10) fit into notches in the spacer rings (19) so that the filtration sheets (10) are spaced apart and supported during assembly and potting, as well as during use as a filter. Alternatively, a spacer ring (19) can be manufactured in one piece by extrusion. The spacer ring (19) may occupy up to all of the length of the bundle (15) between the end caps (18). The length of the spacer ring (19) and the number of spacer rings (19) used may be selected based on technical, manufacturing, or economic considerations.

Figure 12:
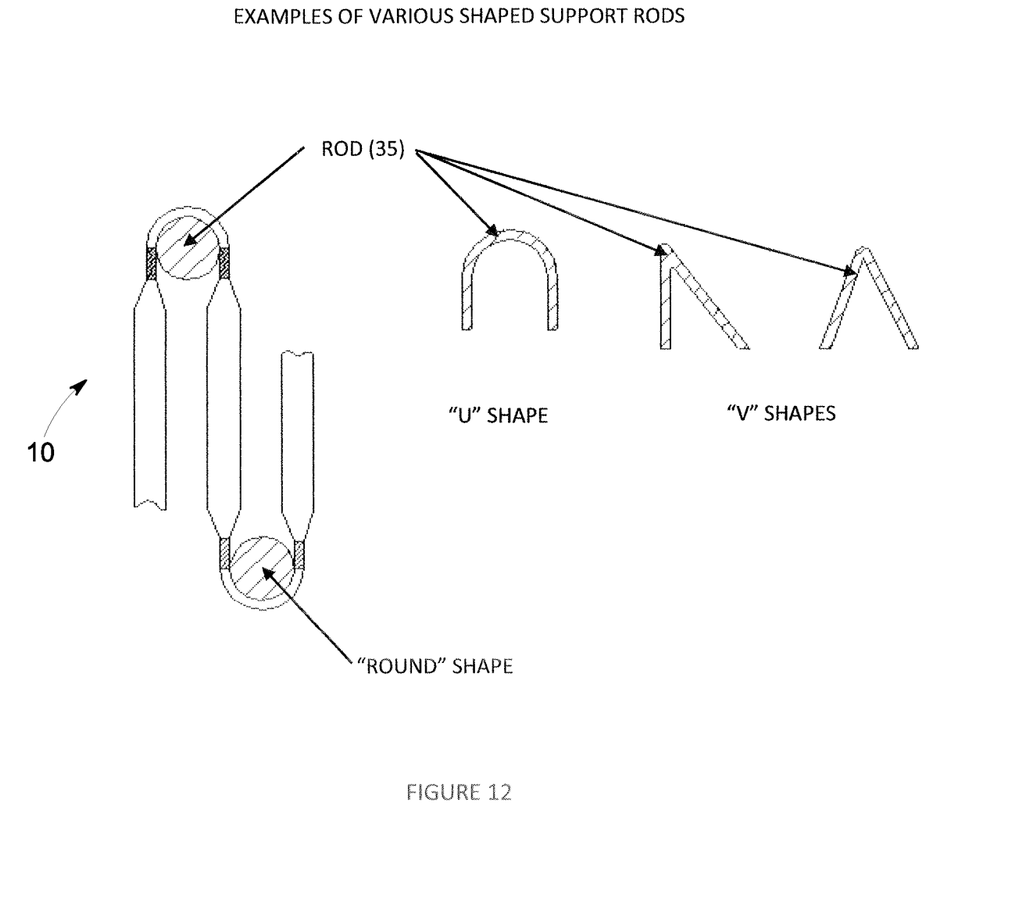
FIG. 12 shows, in cross section, a continuous filtration sheet as shown in FIGS. 1D, 1E and 1F bent around optional support rods having a round cross sectional shape and also showing examples of support rods of alternative shapes being a "U" shape and two variants of a "V" shape.

Optionally rods (35) can be placed in between the filtration sheets (10), or between envelopes of a continuous filtration sheet (10) for support and to help maintain adequate and consistent spacing between consecutive filtration sheets (10) or envelopes, as shown in FIG. 12. The rods (35) can be made in various shapes such as round, "U" or "V" shaped type rods (35). The length of the rods (35) may extend the entire length of a module in between the end-caps (18). The rods (35) may be made from one or more materials such as plastic, metal, fiber reinforced plastic (FRP) or sintered plastic or metal, and may be manufactured through different methods, such as extrusion or vacuum forming.

Spacer rings (19), particularly long spacer rings as in FIGS. 11A and 11B, may be used to help hold the membrane (14) against the structural insert (11) or to prevent adjacent filtration sheets (10) from flexing into contact with each other. Using spacers (19) or attaching the membranes (14) to the inserts (11) as in FIG. 2 allows backwashing the membranes (10). A pillowing effect of the membrane (14) in between the spacers (19) may be observed, but the pressure levels required for backwashing can be low enough to not jeopardize the membrane integrity. The spacers (19) are optional and can also be omitted, particularly in applications not requiring backwashing or if an alternative means (such as an adhesive or sonic welding) is used to attach the membranes (14) to various points dispersed across the surface the inserts (11).

Optionally, one edge of a bundle (15) is potted to form a dead end and the other end of the bundle (15) is potted to form a permeate end. Alternatively, there may be two permeate ends, the choice possibly depending on the intended use or application of the device. A dead end does not need to be attached to a housing and so allows the filtration sheets to freely expand or contract.

Figure 7A:
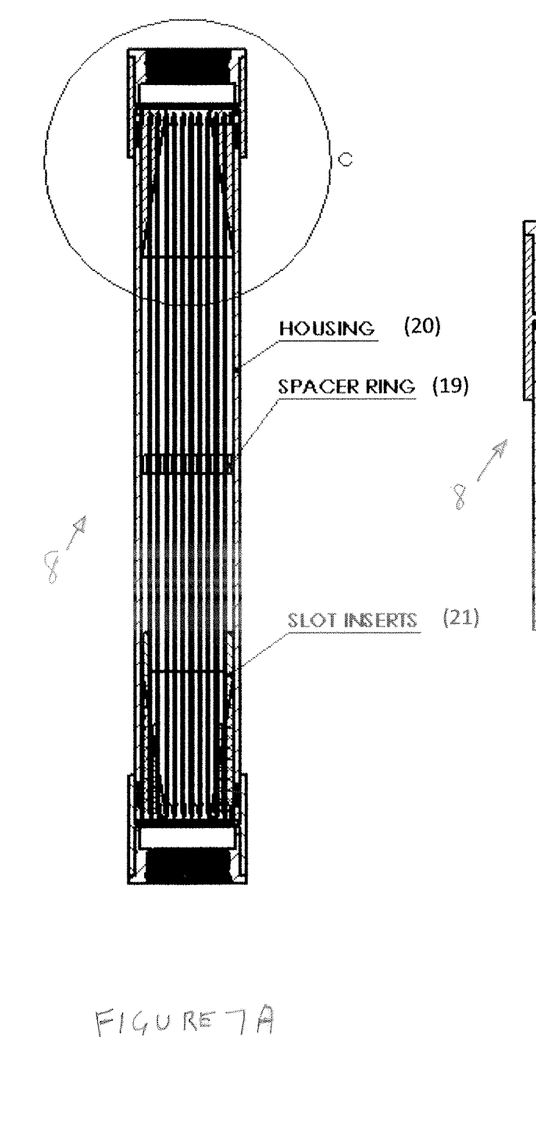
FIG. 7A is a longitudinal cross section of a filtration module having the bundle assembly of FIG. 4 in a housing.

To make a module or element, a bundle (15) is inserted into the housing (20) as shown in FIG. 7A. The housing (20) can have different cross sectional shapes such as round, oval, rectangular or square. The shape may be chosen, for example, based on operating pressure or space constraints. FIG. 7A is a longitudinal cross section of a cylindrical module (8) with the bundle (15) of FIG. 4 that has been potted.

Potting material (16) can be either thermoset or thermoplastic. Potting is the preferred method of holding the filtration sheets (10) together. Prior to potting, slot inserts (21) may be fitted in-between filtration sheets (10) to allow for openings in the potting material. The number and shape of the slot inserts (21) may be determined by the number of filtration sheets (10) selected, the actual size of the module (8), the housing geometry, and the potting method, dynamic or static. Regardless of the slot inserts characteristics, the goal is to create openings through which feed or retentate fluid can enter and exit the feed channels (17) created between the filtration sheets (10). Once the potting material (16) is completely cured, the slot inserts (21) are removed. Potting may be achieved either dynamically, by spinning the module in a centrifuge, or statically, without spinning.

Figure 7B:
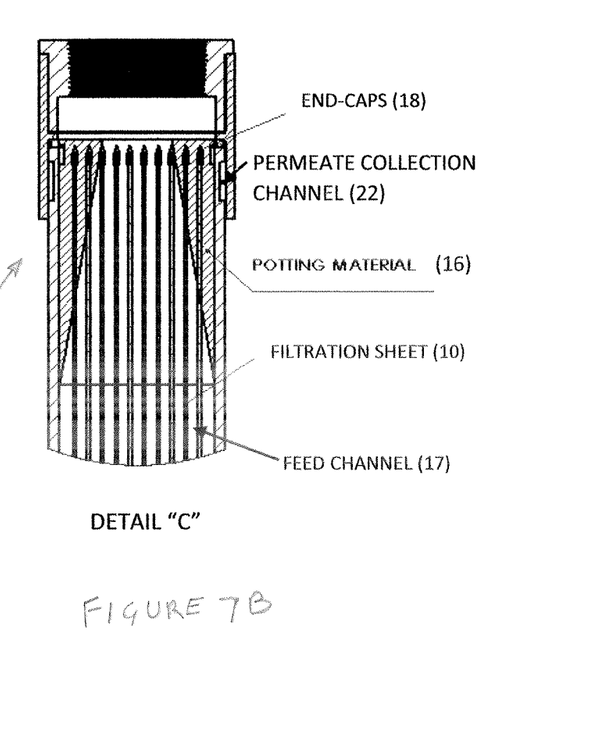
FIG. 7B is an enlarged view of part C of FIG. 7A.
Figure 9:
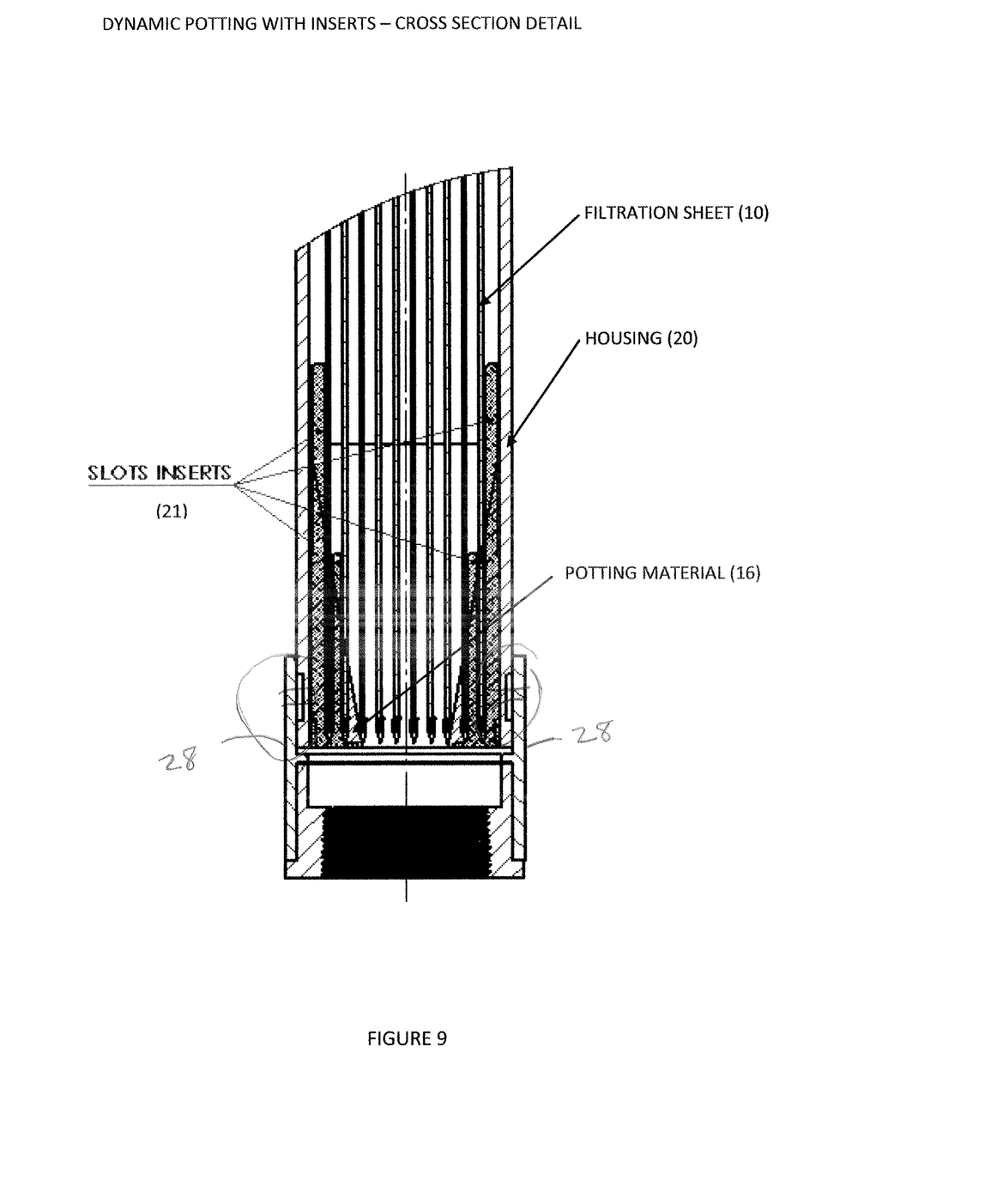
FIG. 9 is an enlargement of the bottom of FIG. 7A showing details, in cross section, of part of the filtration module of FIG. 7A including inserts used with a dynamic potting method.

Dynamic potting is performed by placing the module (8) with the bundle (15) inserted into the housing (20) in a vertical orientation inside a centrifuge, pouring the potting material in liquid form into the lower end of the housing (20), and spinning at a predetermined rate in order to achieve the desired distribution of potting material (16). In the example shown, the potting material is dispersed in a rotational ellipsoid which appears as two triangles when viewed in cross section, as shown in FIG. 7B and in FIG. 9. After one end is potted, the module (8) is inverted in the centrifuge and the other end is potted. The potting in vertical configuration may also be employed to produce other geometries, as required.

Figure 10A:
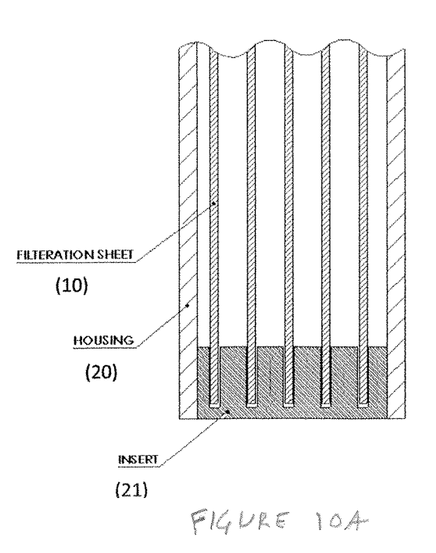
FIG. 10A is a cross sections of one end of an alternative filtration module showing inserts used with a static potting method.
Figure 10B:
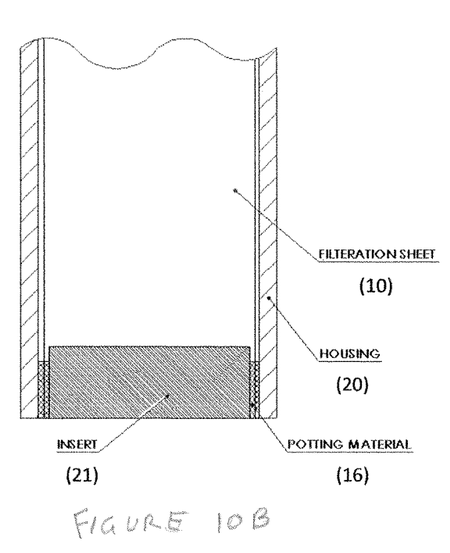
FIG. 10B is another cross section of the end of the alternative filtration module of FIG. 10A, the section line in FIG. 10B being perpendicular to the section line in FIG. 10A.
Figure 10C:
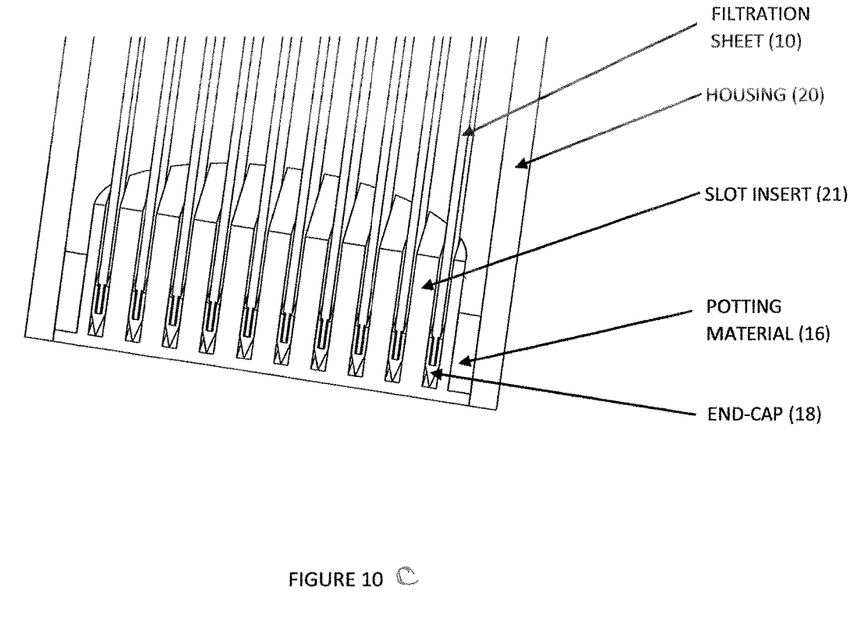
FIG. 10C is an isometric view of the sectioned end of the alternative filtration module shown in FIGS. 10A and 10B.

Alternatively, static potting may be used. In static potting the filtration sheets (10) are attached to the housing (20) using potting material (16), but without spinning the module (8) in a centrifuge. FIGS. 10A, B and C show details of the filtration module (8) with slot inserts (21) fitted between the filtration sheets (10). Potting material (16) in liquid phase is poured into the housing (20) at one end of the bundle (15) and left to cure for a certain amount of time. The opposite end of the module bundle (15) is potted after potting the first end is finished and the potting material (16) is cured to a solid. In the static potting option, slot inserts (21) are used between each of the filtration sheets (10) and between the filtration sheets (10) and the housing (20). The slot inserts (21) are removed after the potting material (16) is cured. Removing the slot inserts (21) creates passages or openings in the potting material (16) for the fluid being filtered to enter and exit the feed channels (17) between the filtration sheets (10) or between the filtration sheets (10) and the housing (20).

Leaks between adjacent filtration sheets (10) and contamination between the feed side and the permeate side of a membrane (14) is prevented by placing a gasket or an insulating material between the sides of the filtration sheets (10) coming in contact with each other or by allowing the potting material (16) to flow in between the filtration sheets (10) and fill in any gaps. If the filtration sheets (10) are essentially planar, then gaskets or potting material (16) or both between the edges of adjacent filtration sheets (10) also space adjacent filtration sheets (10) apart.

By placing the filtration sheets (10) side by side but with spacing between their central areas, a number of feed channels (17) are formed inside the bundle (15). The feed channels (17) have a generally rectangular shape but with narrowed ends formed by the shape of the potting material (16) between the filtration sheets (10). Spacing between the filtration sheets (14) can also be "V" shaped, as opposed to rectangular. Optionally, the feed channels (17) may have a cross section that is oval, arcuate, elliptical, round, rectangular or square. Various cross sectional shapes of the feed channels can be achieved by altering the design of the inserts (11) or spacer rings (19).

Figure 8:
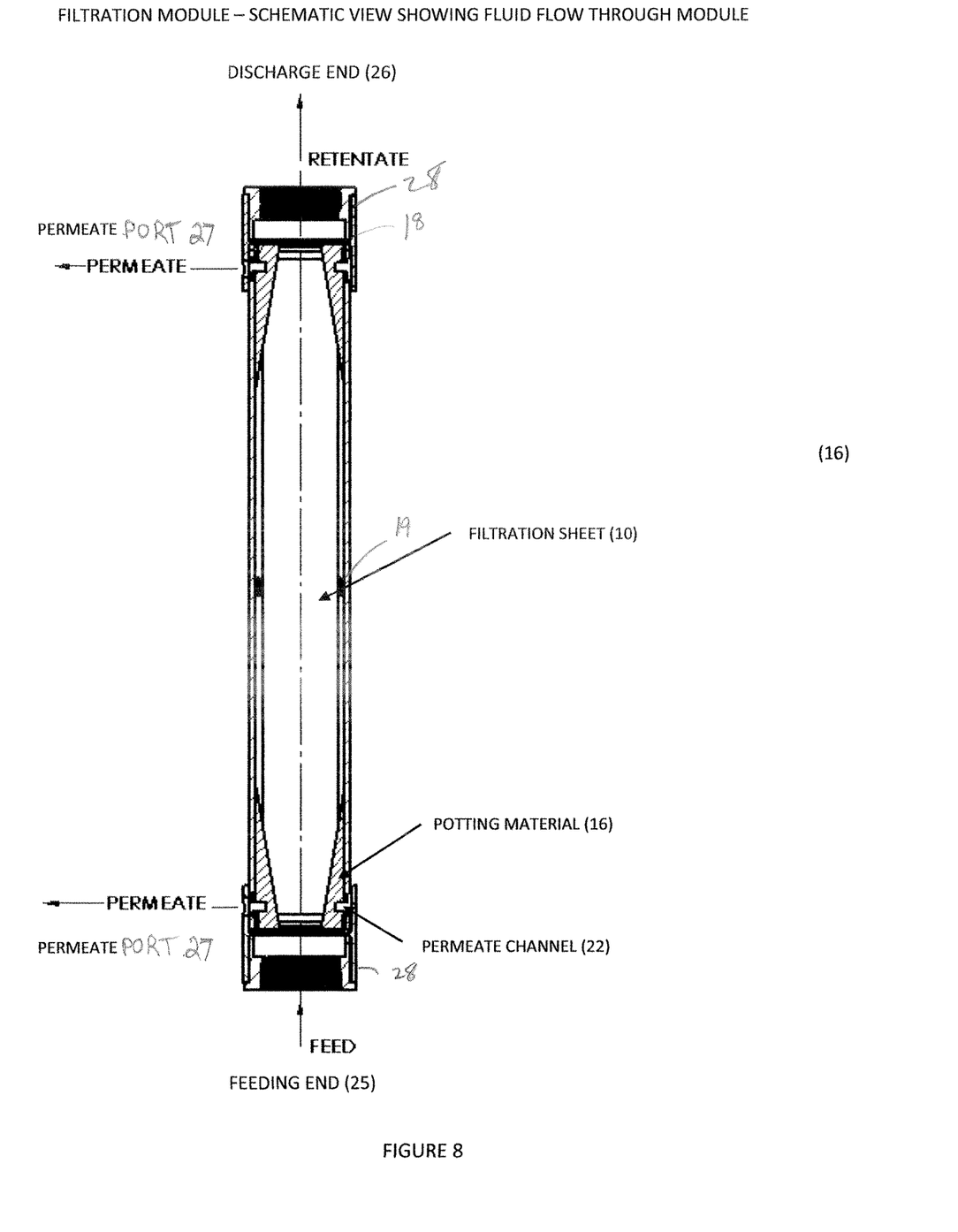
FIG. 8 is a schematic cross-sectional view of a filtration module as in FIG. 7A showing fluid flow through the module.

FIG. 8 is a schematic cross sectional view of the module (8) of FIG. 7 in an elevation view and showing fluid flow through the module (8). Liquid to be filtered is typically fed by means of pressure, for example using a pump or simply a head pressure. Liquid flows from the feeding end (25) through the feed channels (17) to the discharge end (26). Baffles may be added in the housing (20) as required to induce flow through the feed channels (17). The pressure differential between the feed side and the permeate side will force the liquid through the membranes (14) of the bundle (15). Permeate (filtered liquid) will then flow through passages, such as openings, channels or pores, of the inserts (11) or permeate carriers (12) towards the edges of the filtration sheets (10). In FIG. 8, permeate is collected at both ends of the bundle (15). Alternatively, permeate may be collected at one end of the bundle (15) only, rather than at both ends. The choice may depend on the intended use or application of the module (8).

To collect permeate, a notch is cut around the circumference of the housing (20) and extending into the potting material (16) and filtration sheets (10) to create a permeate channel (22). The permeate carriers (12) of the filtration sheets (10) are in fluid communication with the permeate channel (22). A cap (28) adhered or otherwise sealed onto the end of the housing (20) encloses the permeate channel (22). One or more permeate ports (27) in the cap (28) are in fluid communication with the permeate channel (22). Permeate flows into the permeate channel (22) and out the permeate port (27).

The device may be used in a cross flow or dead end configuration. Cross flow is the preferred method. This inhibits suspended solids from concentrating on the membrane surfaces as concentration polarization (even without feed spacers) and provides better control of the retentate concentration. In order to prevent premature degradation of the module performance, the pressure difference may be monitored continuously.

I claim:

1. A membrane filtration element comprising:
   a bundle of planar filtration sheets, wherein each filtration sheet comprises,
      a pair of membranes disposed in stacked spaced relation to one another each membrane having a feed side and a permeate side
   a cylindrical housing in receipt of the bundle of planar filtration sheets, the cylindrical housing having a feed end and that is essentially free of pores in the outer radial surface;
   for each of one or both ends of the housing, a quantity of potting material, the quantity being disposed at the end of the housing for which it is provided, extending in annular relation radially inwards from an inner surface of the cylindrical housing and tapering in thickness as it extends from the end of the housing from which it is provided, the potting material being provided such that at least a central portion of the housing is free of potting material; and,
   wherein
   in use, liquid is forced through the membranes via a pressure differential between the feed side and the permeate side, the filtered liquid being collected as permeate which travels, both from the bundle and through the housing, in a direction perpendicular to the longitudinal axis of the housing;
   each of the plurality of filtration sheets has a width and wherein at least two of the widths of the plurality of filtration sheets are different from each other, the filtration sheets are arranged in the bundle with spaces between the filtration sheets to provide channels between the filtration sheets through which feed fluid can enter at the feed end, and
   the filtration sheets are parallel to a central longitudinal axis of the housing.

2. The membrane filtration element of claim 1 wherein the membrane is a OF or MF membrane.

3. The membrane filtration element of claim 1 having a plurality of the filtration sheets potted together and connected to the housing at one edge and at another edge.

4. The membrane filtration element of claim 1, wherein the housing has a retentate end from which, in use, retentate liquid exits the housing.

5. The membrane filtration element of claim 1, wherein the potting material is provided for each of both ends of the housing.

* * * * *